(12) United States Patent
Ha

(10) Patent No.: US 12,469,334 B2
(45) Date of Patent: Nov. 11, 2025

(54) BATTERY MANAGEMENT DEVICE AND METHOD THEREFOR

(71) Applicants: HYUNDAI MOTOR COMPANY, Seoul (KR); Kia Corporation, Seoul (KR)

(72) Inventor: Dong Gil Ha, Yongin-si (KR)

(73) Assignees: HYUNDAI MOTOR COMPANY, Seoul (KR); Kia Corporation, Seoul (KR)

( * ) Notice: Subject to any disclaimer, the term of this patent is extended or adjusted under 35 U.S.C. 154(b) by 140 days.

(21) Appl. No.: 18/241,453

(22) Filed: Sep. 1, 2023

(65) Prior Publication Data

US 2024/0312260 A1 Sep. 19, 2024

(51) Int. Cl.
| | |
|---|---|
| *G07C 5/00* | (2006.01) |
| *B60L 58/12* | (2019.01) |
| *G07C 5/10* | (2006.01) |
| *H01M 10/42* | (2006.01) |
| *H01M 10/48* | (2006.01) |

(Continued)

(52) U.S. Cl.
CPC .............. *G07C 5/004* (2013.01); *B60L 58/12* (2019.02); *G07C 5/10* (2013.01); *H01M 10/425* (2013.01); *H01M 10/486* (2013.01); *H01M 10/625* (2015.04); *H01M 10/633* (2015.04);

(Continued)

(58) Field of Classification Search
CPC ........... G07C 5/004; G07C 5/10; B60L 58/12; B60L 2240/545; B60L 2260/52; B60L 3/0046; B60L 50/60; B60L 58/24; B60L 2260/54; H01M 10/425; H01M 10/486; H01M 10/625; H01M 10/633; H01M 10/657; H01M 2010/4271; H01M 2220/20; G01R 31/382; B60Y 2200/91;

(Continued)

(56) References Cited

U.S. PATENT DOCUMENTS

| | | | |
|---|---|---|---|
| 8,589,076 B2 | 11/2013 | Hamilton, II et al. | |
| 11,067,403 B2 * | 7/2021 | Lindemann | ....... B60W 50/0098 |

(Continued)

FOREIGN PATENT DOCUMENTS

| | | |
|---|---|---|
| CN | 107323300 A | 11/2017 |
| CN | 110929925 A | 3/2020 |

(Continued)

*Primary Examiner* — Michael J Zanelli
(74) *Attorney, Agent, or Firm* — MORGAN, LEWIS & BOCKIUS LLP

(57) ABSTRACT

The battery management device may include a battery that provides energy to a drive motor that drives a vehicle, a battery system which is configured for measuring a temperature and an state of charge (SOC) value of the battery and is configured to control the temperature of the battery and a processor. The processor is configured to determine an estimated battery temperature and an estimated SOC value of the battery at each of at least one stopover on an expected driving route of the vehicle to reach a destination of the vehicle, determine an estimated charging time for charging the battery to a preset capacity at the stopovers based on the estimated battery temperature and the estimated SOC value, determine a stopover, as a recommended charging point, where the estimated charging time is minimum among the stopovers and provide a user with a guidance for the recommended charging point.

20 Claims, 11 Drawing Sheets

(51) Int. Cl.
    *H01M 10/625*     (2014.01)
    *H01M 10/633*     (2014.01)
    *H01M 10/657*     (2014.01)

(52) U.S. Cl.
    CPC .. *H01M 10/657* (2015.04); *H01M 2010/4271* (2013.01); *H01M 2220/20* (2013.01)

(58) Field of Classification Search
    CPC . B60Y 2200/92; Y02T 10/70; Y02T 10/7072; Y02T 10/72; Y02T 90/40
    See application file for complete search history.

(56) References Cited

U.S. PATENT DOCUMENTS

| | | | | |
|---|---|---|---|---|
| 2019/0315232 | A1* | 10/2019 | Ing | B60L 58/26 |
| 2019/0383628 | A1* | 12/2019 | Quint | G01C 21/3492 |
| 2020/0116516 | A1* | 4/2020 | Kim | B60L 58/10 |
| 2022/0282981 | A1* | 9/2022 | Song | G01C 21/3476 |
| 2023/0242111 | A1* | 8/2023 | Aggoune | B60W 20/12 |
| | | | | 701/22 |
| 2024/0257575 | A1* | 8/2024 | Liu | B60L 1/00 |

FOREIGN PATENT DOCUMENTS

| | | | | |
|---|---|---|---|---|
| CN | 111609867 B | | 9/2020 | |
| CN | 112418610 A | | 2/2021 | |
| CN | 114459498 A | | 5/2022 | |
| CN | 115031746 | | 9/2022 | |
| DE | 102019134615 A1 | * | 6/2021 | ........ B60L 3/12 |
| JP | 2012029491 A | * | 2/2012 | |
| KR | 10-2021-0020645 A | | 2/2021 | |
| WO | WO-2023007106 A1 | * | 2/2023 | |

\* cited by examiner

BATTERY MANAGEMENT DEVICE AND METHOD THEREFOR

CROSS-REFERENCE TO RELATED APPLICATION

The present application claims priority to Korean Patent Application No. 10-2023-0035345, filed on Mar. 17, 2023, the entire contents of which is incorporated herein for all purposes by this reference.

BACKGROUND OF THE PRESENT DISCLOSURE

Field of the Present Disclosure

The present disclosure relates to a battery management device and a method therefor and more particularly, to a technique for managing a battery that provides power to a drive motor of an eco-friendly vehicle.

Description of Related Art

Eco-friendly vehicles using electrical energy are becoming more popular compared to internal combustion engine vehicles using fossil fuels. The eco-friendly vehicle is a vehicle including a drive motor driven by use of electrical energy, and include an electric vehicle (EV), a fuel cell electric vehicle (FCEV), a hybrid vehicle, and the like.

The eco-friendly vehicles tend to use large-capacity batteries to increase mileage, and accordingly, there is an inconvenience in that a time required to charge a battery increases. For user convenience, it is recommended to reduce a charging time as much as possible, but there is a limit to reducing the charging time determined by the design specifications of the battery and battery system.

Therefore, a method for reducing the battery charging time of an eco-friendly vehicle is required.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a battery management device and method configured for reducing a battery charging time of an eco-friendly vehicle.

Another aspect of the present disclosure provides a battery management device and method for reducing a battery charging time regardless of the hardware design of a battery and a battery system.

Yet another aspect of the present disclosure provides a battery management device and method for providing a guidance for an optimal battery charging point in real time based on a driving route of a vehicle.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, a battery management device according to an exemplary embodiment of the present disclosure may include a battery that provides energy to a drive motor that drives a vehicle, a battery system which is configured for measuring a temperature and an SOC value of the battery and is configured to control the temperature of the battery and a processor. The processor is configured to determine an estimated battery temperature and an estimated SOC value of the battery at each of at least one stopover on an expected driving route of the vehicle to reach a destination of the vehicle, determine an estimated charging time for charging the battery to a preset capacity at the at least one stopover based on the estimated battery temperature and the estimated SOC VALUE, and provide a user with a guidance for the estimated charging time at a stopover at which charging of the battery is performed and a recommended charging point where the estimated charging time is minimum.

According to an exemplary embodiment of the present disclosure, the processor is configured to determine estimated cumulative energy consumption of the battery to reach the at least one stopover, determine an attenuation of the SOC value of the battery according to the estimated cumulative energy consumption, and obtain the estimated SOC by subtracting the attenuation of the SOC value of the battery from a measured SOC value of the battery to determine the estimated SOC value of the battery.

According to an exemplary embodiment of the present disclosure, the processor may divide the expected driving route into a plurality of sections, estimate an average speed of each of the sections, determine an estimated energy consumption of each of the sections based on the average speed, and determine the estimated cumulative energy consumption by accumulating the estimated energy consumptions to reach the at least one stopover.

According to an exemplary embodiment of the present disclosure, the processor may obtain the estimated battery temperature using a battery temperature prediction model set in advance based on the SOC value of the battery and the estimated cumulative energy consumption.

According to an exemplary embodiment of the present disclosure, the processor is configured to determine the estimated charging time using a preset charging time function to which the estimated battery temperature and the estimated SOC are input as variables thereof.

According to an exemplary embodiment of the present disclosure, the processor may provide a guidance for the recommended charging point when a deviation between the estimated SOC value of the battery at the recommended charging point and a preset lower limit SOC is less than a preset threshold.

According to an exemplary embodiment of the present disclosure, the processor is configured to determine the estimated battery temperature and the estimated SOC to reach a point where the estimated SOC corresponds to a magnitude of the preset lower limit SOC when a distance of the vehicle to the destination is equal to or greater than a distance to empty (DTE).

According to an exemplary embodiment of the present disclosure, the processor may virtually control a temperature of the battery to reduce a temperature deviation when the temperature deviation between the estimated battery temperature at the recommended charging point and a preset charging reference temperature is greater than or equal to a threshold temperature in a case where the distance to the destination is greater than the distance to empty.

According to an exemplary embodiment of the present disclosure, the processor may, after the temperature of the battery has been virtually controlled, determine a temperature control period in which the temperature of the battery varies from the estimated battery temperature at the recommended charging point to a minimum charging temperature, redetermine the estimated SOC value and the estimated battery temperature based on the energy consumption of the battery during the temperature control period, re-obtain the estimated charging time based on the estimated SOC value and the estimated battery temperature, and redetermine a recommended charging point at which the estimated charging time is minimum.

According to an exemplary embodiment of the present disclosure, the processor may assume operation of the battery system to control the temperature of the battery using the energy consumption of the battery.

According to an aspect of the present disclosure, a battery management method includes determining an estimated battery temperature and an estimated SOC value of the battery at each of at least one stopover on an expected driving route of the vehicle to reach a destination of the vehicle, determining an estimated charging time for charging the battery to a preset capacity at the at least one stopover based on the estimated battery temperature and the estimated SOC VALUE, and providing a user with a guidance for the estimated charging time at a stopover at which charging of the battery is performed and a recommended charging point where the estimated charging time is minimum.

According to an exemplary embodiment of the present disclosure, the determining of the estimated SOC value of the battery includes determining estimated cumulative energy consumption of the battery to reach the at least one stopover, determining an attenuation of the SOC value of the battery according to the estimated cumulative energy consumption, and obtaining the estimated SOC by subtracting the attenuation of the SOC value of the battery from a measured SOC value of the battery to determine the estimated SOC value of the battery.

According to an exemplary embodiment of the present disclosure, the determining of the estimated cumulative energy consumption may include dividing the expected driving route into a plurality of sections, estimating an average speed of each of the sections, determining an estimated energy consumption of each of the sections based on the average speed, and determining the estimated cumulative energy consumption by accumulating the estimated energy consumptions to reach the at least one stopover.

According to an exemplary embodiment of the present disclosure, the determining of the estimated battery temperature of the battery may include using a battery temperature prediction model set in advance based on the SOC value of the battery and the estimated cumulative energy consumption.

According to an exemplary embodiment of the present disclosure, the determining of the estimated charging time may include using a preset charging time function to which the estimated battery temperature and the estimated SOC are input as variables thereof.

According to an exemplary embodiment of the present disclosure, the providing of the guidance for the recommended charging point may include providing a guidance for the recommended charging point when a deviation between the estimated SOC value of the battery at the recommended charging point and a preset lower limit SOC is less than a preset threshold.

According to an exemplary embodiment of the present disclosure, the determining of the estimated battery temperature and the estimated SOC may include determining the estimated battery temperature and the estimated SOC to reach a point where the estimated SOC corresponds to a magnitude of the preset lower limit SOC when a distance of the vehicle to the destination is equal to or greater than a distance to empty (DTE).

According to an exemplary embodiment of the present disclosure, the battery management method may further include virtually controlling a temperature of the battery to reduce a temperature deviation when the temperature deviation between the estimated battery temperature at the recommended charging point and a preset charging reference temperature is greater than or equal to a threshold temperature based on the distance to the destination being greater than the distance to empty.

According to an exemplary embodiment of the present disclosure, the battery management method may further include, after the temperature of the battery has been virtually controlled, determining a temperature control period in which the temperature of the battery varies from the estimated battery temperature at the recommended charging point to a minimum charging temperature, redetermining the estimated SOC value and the estimated battery temperature based on the energy consumption of the battery during the temperature control period, and re-obtaining the estimated charging time based on the estimated SOC value and the estimated battery temperature, and redetermining a recommended charging point at which the estimated charging time is minimum.

According to an exemplary embodiment of the present disclosure, the virtually controlling of the temperature of the battery may include controlling the temperature of the battery using the energy consumption of the battery.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
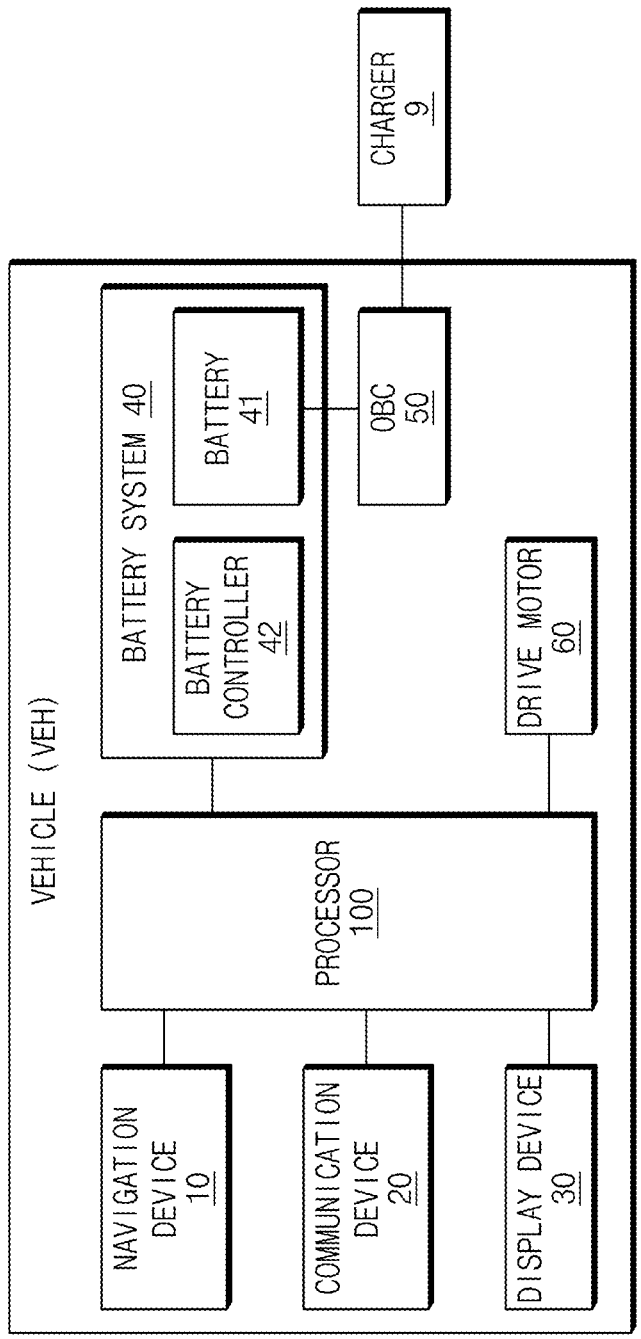
FIG. 1 is a diagram illustrating a configuration of a battery management device for an eco-friendly vehicle according to an exemplary embodiment of the present disclosure.

It may be understood that the appended drawings are not necessarily to scale, presenting a somewhat simplified representation of various features illustrative of the basic principles of the present disclosure. The predetermined design features of the present disclosure as included herein, including, for example, specific dimensions, orientations, locations, and shapes will be determined in part by the particularly intended application and use environment.

In the figures, reference numbers refer to the same or equivalent portions of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, various exemplary embodiments of the present disclosure will be described in detail with reference to the exemplary drawings. In adding the reference numerals to the components of each drawing, it should be noted that the identical or equivalent component is predetermined by the identical numeral even when they are displayed on other drawings. Furthermore, in describing the exemplary embodiment of the present disclosure, a detailed description of well-known features or functions will be ruled out in order not to unnecessarily obscure the gist of the present disclosure.

In describing the components of the exemplary embodiment of the present disclosure, terms such as first, second, "A", "B", (a), (b), and the like may be used. These terms are merely intended to distinguish one component from another component, and the terms do not limit the nature, sequence or order of the constituent components. Unless otherwise defined, all terms used herein, including technical or scientific terms, include the same meanings as those generally understood by those skilled in the art to which the present disclosure pertains. Such terms as those defined in a generally used dictionary are to be interpreted as including meanings equal to the contextual meanings in the relevant field of art, and are not to be interpreted as including ideal or excessively formal meanings unless clearly defined as including such in the present application.

Hereinafter, various embodiments of the present disclosure will be described in detail with reference to FIGS. 1 to 11.

FIG. 1 is a diagram illustrating a configuration of a battery management device for an eco-friendly vehicle according to an exemplary embodiment of the present disclosure. A vehicle shown in FIG. 1 may be an eco-friendly vehicle using a battery for driving, and may refer to an electric vehicle (EV) or a hybrid vehicle.

Referring to FIG. 1, a control device for an eco-friendly vehicle according to an exemplary embodiment of the present disclosure may include a navigation device 10, a communication device 20, a display device 30, a battery system 40, an on-board charger (OBC) 50, a drive motor 60, and a processor 100.

The navigation device 10 may detect current location information of the vehicle through a global positioning system (GPS) sensor or the like. The navigation device 10 may search for a driving route from the current location of the vehicle to a destination based on destination information input by a vehicle user. The navigation device 10 may store map data used for route search in an internal memory for route search. Each road in the map data used for route search may be divided into at least one road section or link, and the map data may include road information for each road section. Furthermore, the road information may include a road type (a free road, an expressway, or the like), a road attribute (a toll gate, an intersection, or the like), a speed limit, gradient information, and the like of the corresponding road section. The map data may further include point of interest (POI) information including location information of major restaurants, gas stations, electric vehicle charging stations or the like.

The navigation device 10 may receive traffic information from a traffic information providing server through the communication device 20 for route search. Here, the traffic information may include a degree of congestion and an average vehicle speed (hereinafter referred to as "road average vehicle speed") in each road section. The navigation device 10 may search for a driving route to a destination using the above-described map data and traffic information.

The navigation device 10 may provide location information and traffic information to the processor 100.

The communication device 20 may include a Global Positioning System (GPS) module or a Differential Global Positioning System (DGPS) module for obtaining location information.

The communication device 20 may transmit and receive a radio signal to or from at least one of a base station, an external terminal, and a center on a mobile communication network established according to technical standards or communication methods for mobile communication. For example, the communication device 20 may perform communication based on Global System for Mobile Communication (GSM), Code Division Multi Access (CDMA), Code Division Multi Access 2000 (CDMA2000), EV-DO (Enhanced Voice-Data Optimized or Enhanced Voice-Data Only), Wideband CDMA (WCDMA), High Speed Downlink Packet Access (HSDPA), High Speed Uplink Packet Access (HSUPA), Long Term Evolution (LTE), or Long Term Evolution-Advanced (LTE-A). A radio signal may include a voice call signal, a video call signal, or various types of data according to text/multimedia message transmission/reception.

The display device 30 may display various types of information and data processed by the processor 100 or other accessory devices. For example, the display device 30 may display route guidance information related to a driving route found through the navigation device 10. Also, the display device 30 may display guidance information related to a battery charging station corresponding to a recommended charging point.

As the display device 30, an Audio, Video and Navigation (AVN), a cluster, a Head Up Display (HUD), or the like of the vehicle may be used. Also, the display device 30 may be coupled to a touch panel to receive a user input.

The battery system 40 may include a battery 41 that provides electrical energy to the drive motor 60 of the vehicle and a battery management system (BMS) 42 that manages the battery 41. The battery management system 42 may be configured for controlling charging and discharging of the battery 41, cell balancing, and the like. The battery management system 42 may identify an state of charge (SOC) value of the battery 41 based on battery state information (voltage, current, temperature, or the like) detected from the battery 41.

The OBC 50 may convert AC power input to the vehicle from a charger 9 into DC power to charge the battery 41.

The charger 9 may provide commercial AC power to the onboard charger (OBC) 50 in a form of AC.

The processor 100 may be configured to determine a recommended charging point at which the estimated charging time of the battery 41 is minimized based on location information and traffic information provided through the navigation device 10 or the communication device 20, and provide the recommended charging point to the user through the display device 30. The estimated charging time may mean a time period required to charge the battery 41 to a certain capacity and not a time period required to charge the battery 41 to a full capacity. For example, the estimated charging time may mean a time period required to charge the battery 41 to the SOC value of 10%.

The processor 100 may be configured to determine an estimated battery temperature and an estimated SOC value of the battery 41 at stopovers on an expected driving route to the destination.

For example, the processor 100 may obtain the estimated SOC by subtracting an attenuation of SOC from a measured SOC. The attenuation of SOC may be determined based on the estimated cumulative energy consumption to the stopovers. The estimated cumulative energy consumption may be determined based on an average speed of sections after dividing an expected driving route into a plurality of sections. The processor 100 may use the expected driving route provided from the navigation device 10, information related to traffic flow on the predicted driving route, and information related to times required to reach stopovers on the predicted driving route to determine the estimated cumulative energy consumption.

Also, the processor 100 may be configured to determine an estimated battery temperature of the battery using a preset battery temperature prediction model. The battery temperature prediction model may be designed using a relationship in which the temperature of the battery changes according to the battery's SOC value and cumulative energy consumption, and may be stored in a memory.

The processor 100 may be configured to determine an estimated charging time for charging the battery 41 at stopovers based on the estimated battery temperature and estimated SOC value of the battery 41.

The processor 100 may use a preset charging time function to determine the estimated charging time. The charging time function may output an estimated charging time when the temperature of the battery 41 and the SOC value of the battery 41 are input to the charging time function as variables. The charging time function may be designed based on the characteristics of the battery system 40. The temperatures of the battery 41 and the battery system 40 may vary according to the output of the battery 41, and a change in the temperature may be affected by the SOC value of the battery 41. The charging time function may be set based on a table in which a change in temperature according to the output of the battery 41 is experimentally determined.

The processor 100 may be configured to determine a point at which an estimated charging time is minimum among stopovers as a recommended charging point, and inform the user of the recommended charging point.

Furthermore, when a temperature deviation between the estimated battery temperature at the recommended charging point and a preset lowest charging temperature is greater than or equal to a threshold temperature, the processor 100 may be configured for controlling the temperature of the battery 41 to reduce the temperature deviation. The lowest charging temperature may refer to the lowest temperature of a temperature range in which the battery 41 has good charging efficiency. The control of the temperature of the battery 41 may use a temperature control device implemented in the battery system 40.

The processor 100 may perform artificial intelligence learning in a process of determining a recommended charging point. For example, the processor 100 may learn traffic information in a process of determining an expected driving route based on a destination. Alternatively, traffic information may be learned to determine an estimated energy consumption of the battery. Alternatively, the measured SOC value of the battery 41 and the estimated energy consumption of the battery 41 may be learned to determine the estimated battery temperature of the battery. To the present end, the processor 100 may include an artificial intelligence (hereinafter referred to as AI) processor. The AI processor may learn a neural network using a pre-stored program. A neural network for detecting a target vehicle and a dangerous vehicle may be designed to simulate a human brain structure on a computer, and may include a plurality of network nodes including weights that simulate neurons of a human neural network. The plurality of network nodes may transmit and receive data according to their connection relationships to simulate synaptic activity of neurons that transmit and receive signals through synapses. The neural network may include a deep learning model developed from a neural network model. In the deep learning model, a plurality of network nodes may exchange data according to convolution connection relationships while being located in different layers. Examples of neural network models may include various deep learning techniques such as deep neural networks (DNN), convolutional deep neural networks (CNN), recurrent Boltzmann machines (RNN), restricted Boltzmann machines (RBM), deep belief networks (DBN) and deep Q-networks.

The processor 100 may include a memory for storing an algorithm for operation and an AI processor. The memory may be implemented using a hard disk drive, flash memory, electrically erasable programmable read-only memory (EEPROM), static RAM (SRAM), ferro-electric RAM (FRAM), phase-change RAM (PRAM), magnetic RAM (MRAM), Dynamic Random Access (DRAM), Synchronous Dynamic Random Access Memory (SDRAM), Double Date Rate-SDRAM (DDR-SDRAM), and the like.

Figure 2:
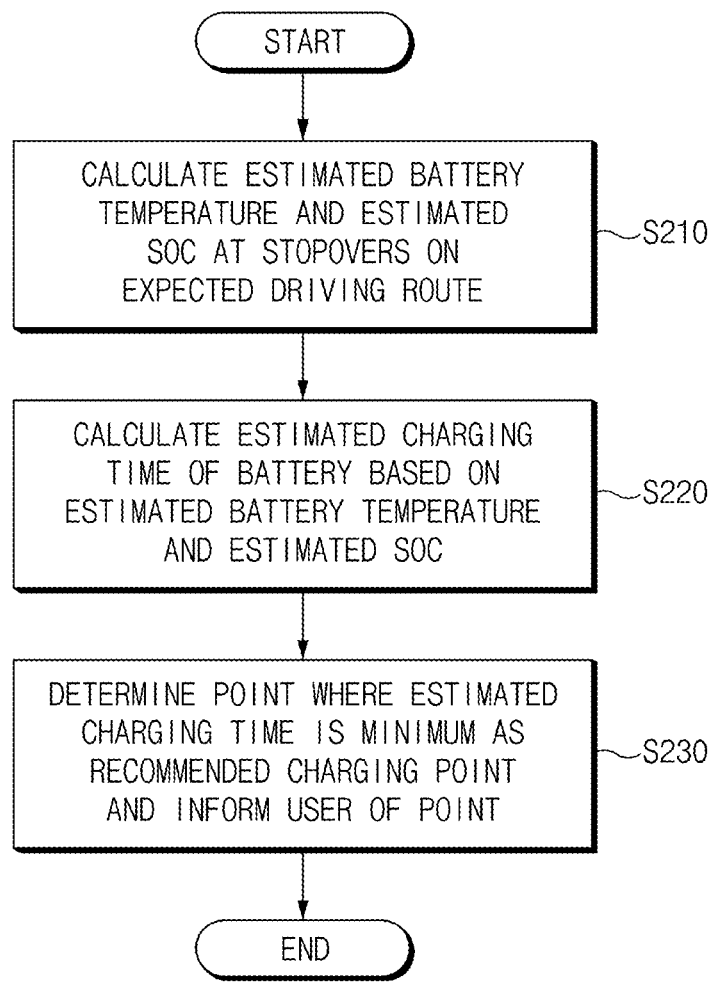
FIG. 2 is a flowchart for describing a battery management method of an eco-friendly vehicle according to an exemplary embodiment of the present disclosure.

FIG. 2 is a flowchart for describing a battery management method of an eco-friendly vehicle according to an exemplary embodiment of the present disclosure. It may be understood that the processes shown in FIG. 2 are performed by the processor 100 shown in FIG. 1.

Hereinafter, a battery management method for an eco-friendly vehicle according to an exemplary embodiment of the present disclosure will be described with reference to FIG. 2.

In S210, the processor 100 may be configured to determine an estimated battery temperature and an estimated SOC value of the battery 41 at stopovers on an expected driving route to the destination.

To the present end, the processor 100 may be configured to determine estimated cumulative energy consumption of the battery 41. The processor 100 may divide an expected driving route into a plurality of sections and estimate an average speed of each section. The processor 100 may be configured to determine estimated energy consumption in each of the sections based on the average speeds of the sections and accumulate an estimated energy consumption to reach stopovers. The processor 100 may be configured to determine the attenuation of SOC value of the battery 41 based on the estimated cumulative energy consumption. Also, the processor 100 may obtain the estimated SOC by subtracting the attenuation of SOC from a measured SOC value of the battery 41.

Furthermore, the processor 100 may be configured to determine an estimated battery temperature based on the SOC value of the battery 41 and the estimated cumulative energy consumption. To the present end, the processor 100 may use a battery temperature prediction model.

In S220, the processor 100 may be configured to determine an estimated charging time for charging the battery 41 at stopovers based on the estimated battery temperature and estimated d SOC value of the battery 41.

The processor 100 may use a charging time function to which an estimated battery temperature and an estimated SOC value of the battery 41 are input as variables thereof.

In S230, the processor 100 may inform the user of estimated charging times at stopovers or a recommended charging point.

Because the vehicle is able to be charged at two or more stopovers, the processor 100 may inform the user of the estimated charging time at each stopover.

Furthermore, the processor 100 may be configured to determine a stopover with a minimum estimated charging time as a recommended charging point, and inform the user of the recommended charging point, giving the user guidance for a stopover capable of reducing the charging time the most.

Hereinafter, a detailed embodiment of each process shown in FIG. 2 will be described.

Figure 3:
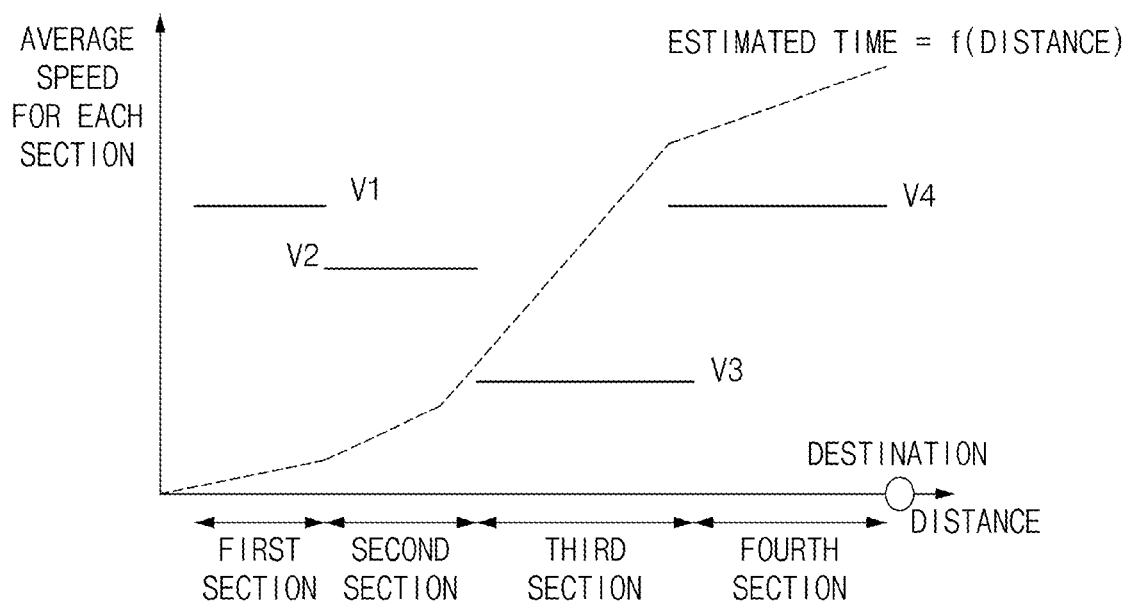
FIG. 3 is a diagram for describing an exemplary embodiment of determining an average speed for each section.
Figure 4:
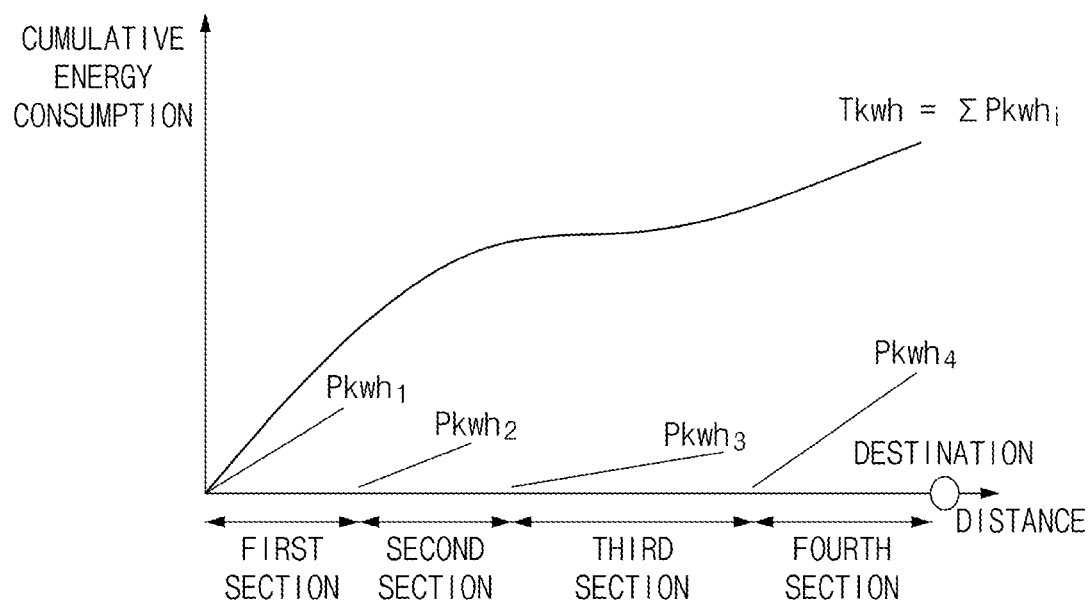
FIG. 4 is a diagram for explaining an exemplary embodiment of determining cumulative energy consumption of a battery.
Figure 5:
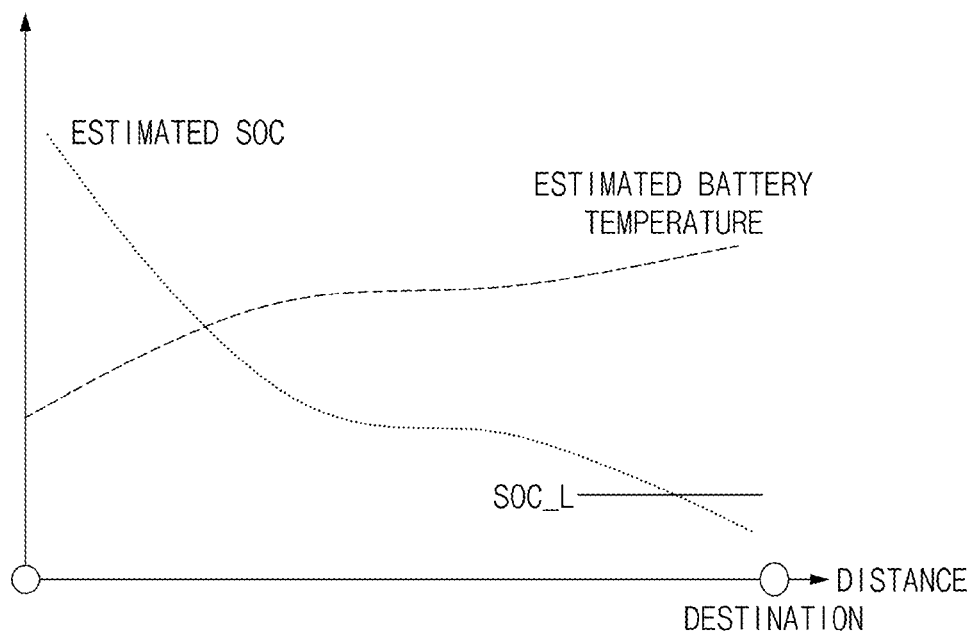
FIG. 5 is a diagram for describing a method of obtaining an estimated SOC value and an estimated battery temperature.

FIG. 3, FIG. 4, and FIG. 5 are diagrams for describing a method of determining an estimated SOC value of a battery and an estimated battery temperature of the battery according to an exemplary embodiment of the present disclosure.

FIG. 3 is a diagram for describing an average speed for each section and a cumulative time to reach stopovers. In FIG. 3, a horizontal axis may represent distances of stopovers located on an expected driving route to a destination, and a vertical axis may represent arrival times to the stopovers and an average speed for each section.

Referring to FIG. 3, the processor 100 may divide an expected driving route to a destination into a plurality of sections. The processor 100 may be configured to determine adjacent stopovers including similar congestion levels as one section. For example, a first section and a fourth section are sections including stopovers with less traffic congestion, a second section is a section including stopovers with somewhat traffic congestion, and a third section is a section including stopovers with severe traffic congestion. That is, when a congestion level is greater than or equal to a preset congestion level among adjacent stopovers, the processor 100 may divide a section at a corresponding point.

The processor 100 may obtain an average speed of each section. For example, the average speed of the first section may be obtained as "V1", the average speed of the second section as "V2", the average speed of the third section as "V3", and the average speed of the fourth section as "V4".

The processor 100 may be configured to determine a travel time based on the average speed and distance. The travel time may be an estimated time required to reach an arbitrary point on an expected driving route.

FIG. 4 is a diagram for explaining an exemplary embodiment of determining cumulative energy consumption of a battery.

Referring to FIG. 4, the processor 100 may be configured to determine estimated energy consumption of the battery 41 for each section to determine cumulative energy consumption of the battery 41. For example, the processor 100 may be configured to determine the estimated energy consumption of a first section as WPkwh1, determine the estimated energy consumption of a second section as WPkwh2, determine the estimated energy consumption of a third section as WPkwh3, and determine the estimated energy consumption of a fourth section as WPkwh4.

The processor 100 may accumulate energy consumption caused by the battery 41 until a certain stopover is reached and determine estimated cumulative energy consumption of the battery 41 at the stopover.

FIG. 5 is a diagram for describing a method of obtaining an estimated SOC value and an estimated battery temperature.

The processor 100 may be configured to determine an estimated SOC as shown in FIG. 5 by subtracting the attenuation of SOC from a measured SOC value of the battery 41.

The attenuation of SOC may be determined based on the estimated energy consumption of the battery 41 described in FIG. 4. For example, the processor 100 may be configured to determine the attenuation of SOC to be in proportion to the estimated energy consumption of the battery 41. The processor 100 may be configured to determine the attenuation of SOC based on the following [Equation 1].

$$\text{Attenuation of SOC} = \text{measured SOC} - (\text{energy consumption of battery})/(\text{total energy of battery at full charge state}) \times 100 \quad \text{[Equation 1]}$$

The estimated battery temperature of the battery 41 may be determined using a battery temperature prediction model set in advance based on a relationship between the SOC value of the battery 41 and power consumption.

Furthermore, when a lower limit SOC SOC_L is set, the processor 100 may be configured to determine an estimated SOC to a stopover corresponding to the lower limit SOC SOC_L and an estimated battery temperature of the battery 41.

The lower limit SOC SOC_L may be preset or determined by a user input.

Figure 6:
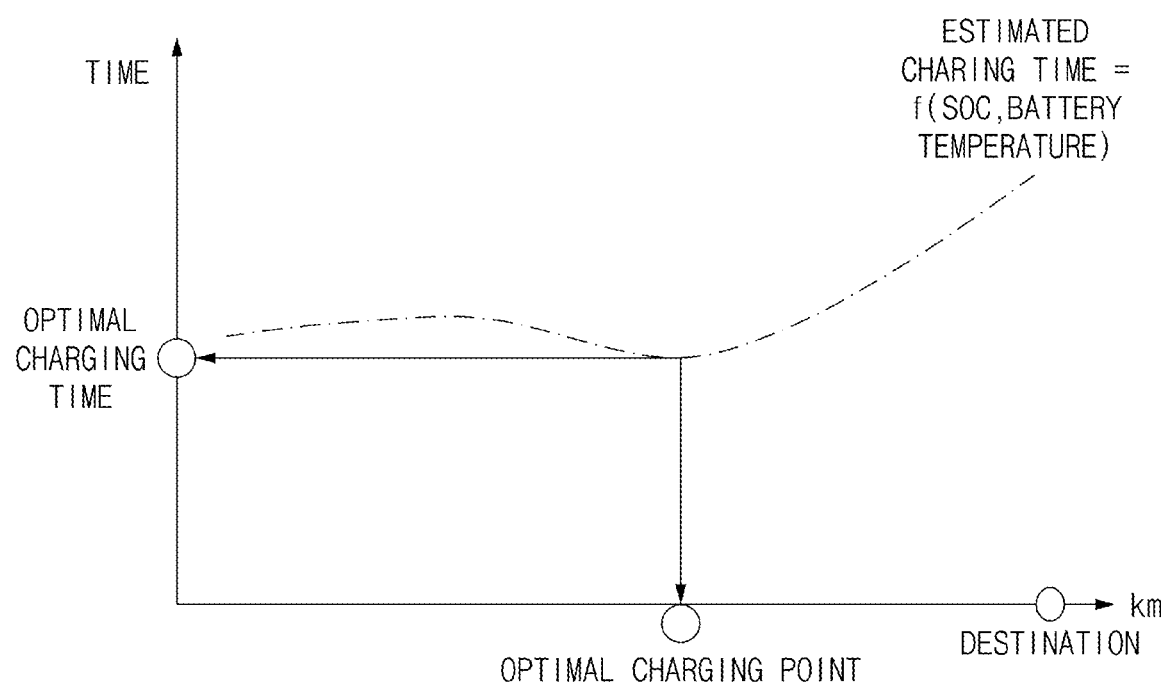
FIG. 6 is a diagram for describing an estimated charging time and a recommended charging point.

FIG. 6 is a diagram for describing an estimated charging time and a recommended charging point.

Referring to FIG. 6, the processor 100 may identify estimated charging times of stopovers on an expected driving route and determine a stopover including the shortest estimated charging time as a recommended charging point.

Figure 7:
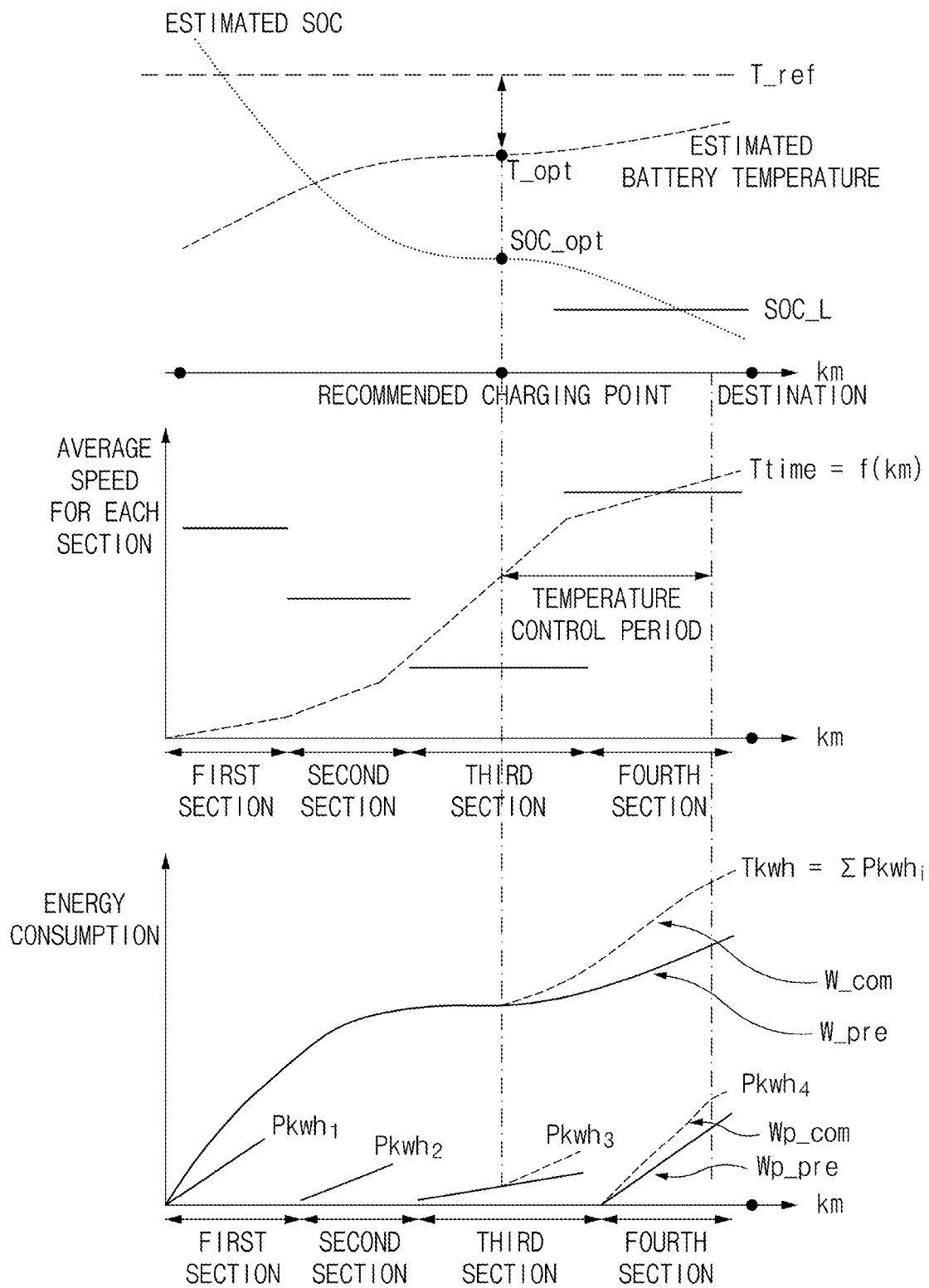
FIG. 7 is a diagram for describing a method of redetermining energy consumption of a battery according to control of a battery temperature.
Figure 8:
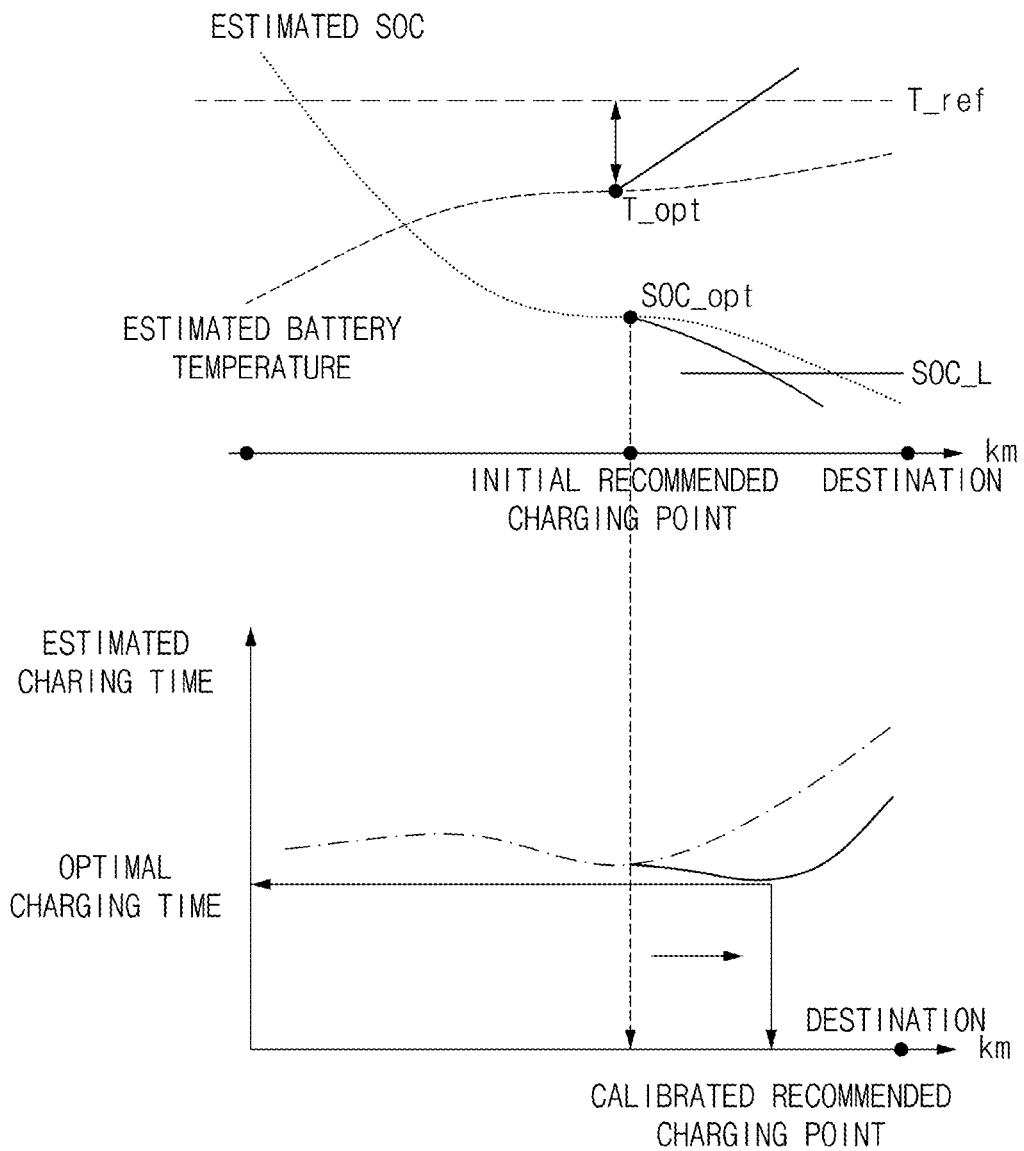
FIG. 8 is a diagram for describing a method of compensating a recommended charging point based on redetermined energy consumption of a battery.

FIG. 7 and FIG. 8 are diagrams for describing a method of resetting a recommended charging point according to control of a battery temperature.

FIG. 7 is a diagram for describing a method of redetermining energy consumption of a battery according to control of a battery temperature.

Referring to FIG. 7, the processor 100 may identify an estimated battery temperature T_opt at a recommended charging point and an estimated SOC SOC_opt at the recommended charging point.

The processor 100 may compare the estimated battery temperature T_opt at the recommended charging point with a charging reference temperature. The charging reference temperature may be set within a temperature range in which the charging efficiency of the battery is good, and the charging efficiency according to the battery temperature will be described later with reference to FIG. 10. FIG. 7 shows a case where the estimated battery temperature T_opt at a recommended charging point is lower than a charging reference temperature T_ref.

The processor 100 may set a temperature control period in proportion to a deviation between the estimated battery temperature T_opt at a recommended charging point and the charging reference temperature T_ref. The temperature control period may mean a time period for controlling the temperature of the battery 41 using a temperature control device of the battery system 40. In a process of controlling the temperature of the battery 41 using the temperature control device, the change amount in temperature of the battery 41 may be at a constant level per unit time. Therefore, the temperature control period may be obtained by dividing the deviation between the estimated battery temperature T_opt at the recommended charging point and the charging reference temperature T_ref by the change amount in temperature per unit time. FIG. 7 shows a case where the temperature control period corresponds to a time required until a destination is reached from a recommended charging point.

The processor 100 may virtually start temperature control when a recommended charging point is determined. That is, the processor 100 may start temperature control at an estimated time corresponding to a recommended charging point.

Because the temperature control device consumes power of the battery 41, energy consumption of the battery 41 during the temperature control period may increase. For example, when energy consumption in a unit section before temperature control includes the slope of a graph "Wp_pre" indicated by a solid line, power consumption by section during the temperature control period may be represented by the slope of a graph "Wp_com" indicated by a dotted line.

Because energy consumption of the battery 41 increases during the temperature control period, estimated cumulative power consumption Tkwh may appear larger in the graph W_com after temperature control than in the graph W_Pre before temperature control.

FIG. 8 is a diagram for describing a method of compensating a recommended charging point based on redetermined energy consumption of a battery. In FIG. 8, an initial recommended charging point may mean a recommended charging point determined before temperature control.

Referring to FIG. 8, an estimated battery temperature may increase as indicated by a solid line when temperature control of the battery 41 is being performed at the initial recommended charging point, and the charging reference temperature T_ref may be reached.

Also, as the estimated battery temperature increases, the estimated SOC value of the battery 41 may decrease as indicated by the solid line.

As the estimated SOC decreases and the estimated battery temperature approaches a charging reference temperature, the estimated charging time may decrease.

The processor 100 may be configured to determine a point at which the estimated charging time is minimum and determine a calibrated recommended charging point.

Figure 9:
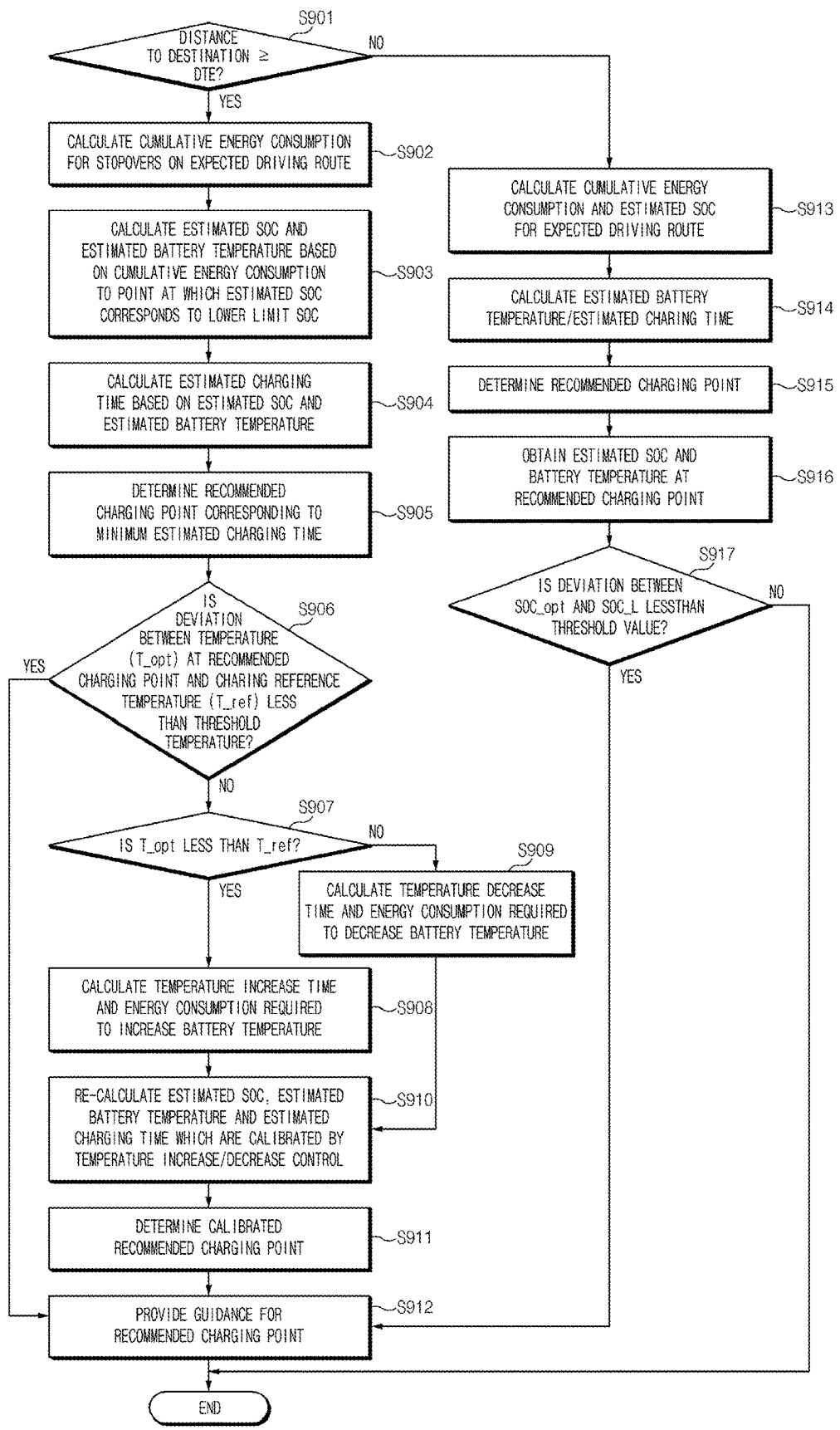
FIG. 9 is a flowchart for describing a battery management method according to another exemplary embodiment of the present disclosure.

FIG. 9 is a flowchart for describing a battery management method according to another exemplary embodiment of the present disclosure.

A battery management method according to another exemplary embodiment will be described below with reference to FIG. 9.

In S901, the processor 100 may compare a distance to a destination with a distance to empty (DTE).

In S902, when the distance to the destination is greater than or equal to the DTE, the processor 100 may be configured to determine cumulative energy consumption for stopovers on an expected driving route. The processor 100 may divide the expected driving route into a plurality of sections and determine energy consumption for each section based on an average speed for each section. Also, the processor 100 may be configured to determine cumulative energy consumption to stopovers based on energy consumption for each section.

In S903, the processor 100 may be configured to determine an estimated SOC value and an estimated battery temperature to stopovers based on the cumulative energy consumption.

In S904, the processor 100 may be configured to determine an estimated charging time based on the estimated SOC value and the estimated battery temperature. The estimated charging time may refer to a time required to charge the battery 41 to store preset energy.

In S905, the processor 100 may be configured to determine a recommended charging point corresponding to the minimum estimated charging time including the smallest magnitude among estimated charging times up to the lower limit SOC.

In S906, the processor 100 may compare a deviation between a temperature T_opt at the recommended charging point and a charging reference temperature T_Lb with a preset threshold temperature.

In S907, when a deviation between the temperature T_opt at the recommended charging point and the charging reference temperature T_Lb is less than a threshold temperature, the processor 100 may be configured to determine whether the temperature T_opt at the recommended charging point is less than the charging reference temperature T_Lb.

In S908, when the temperature T_opt at the recommended charging point is less than the charging reference temperature T_Lb, the processor 100 may be configured to determine a temperature increase time required to increase the battery temperature and energy consumption of the battery 41. When it is assumed that the temperature of the battery 41 is to be increased by a temperature obtained by subtracting the temperature T_opt at the recommended charging point from the charging reference temperature T_Lb, the processor 100 may be configured to determine the temperature increase time and the energy consumption of the battery 41.

In S909, when the temperature T_opt at the recommended charging point is greater than or equal to the charging reference temperature T_Lb, the processor 100 may be configured to determine a temperature decrease time required to decrease the battery temperature and energy consumption of the battery 41. When it is assumed that the temperature of the battery 41 is to be decreased by a temperature obtained by subtracting the charging reference temperature T_Lb from the temperature T_opt at the recommended charging point, the processor 100 may be configured to determine the temperature decrease time and the energy consumption of the battery 41.

In S910, the processor 100 may redetermine a calibrated estimated SOC value and a calibrated estimated battery temperature according to the temperature increase condition determined in S908 or the temperature decrease condition determined in S909. Also, the processor 100 may redetermine the calibrated estimated charging time based on the calibrated estimated SOC value and the calibrated estimated battery temperature.

In S911, the processor 100 may be configured to determine a point where the calibrated estimated charging time is minimum as a calibrated recommended charging point.

In S912, the processor 100 may search for a charging station corresponding to the calibrated recommended charging point and provide guidance for the charging station through the display device 30.

In S913, when a distance of the vehicle to the destination is less than a DTE, the processor 100 may be configured to determine a cumulative energy consumption and the estimated SOC on an expected driving route.

In S914, the processor 100 may be configured to determine an estimated battery temperature based on the estimated SOC. Also, the processor 100 may be configured to determine an estimated charging time based on the estimated SOC value and the estimated battery temperature.

In S915, the processor 100 may be configured to determine a point where the estimated charging time is minimum as a recommended charging point.

In S916, the processor 100 may obtain the estimated SOC SOC_opt and the estimated battery temperature T_opt, which correspond to the recommended charging point.

In S917, the processor 100 may compare a deviation between the estimated SOC SOC_opt corresponding to the recommended charging point and the lower limit SOC SOC_L with a preset threshold. When the deviation between the estimated SOC SOC_opt corresponding to the recommended charging point and the lower limit SOC SOC_L is small and is within a preset threshold, it may be determined that the battery 41 needs to be charged before reaching the destination. Therefore, when the deviation between the estimated SOC SOC_opt and the lower limit SOC SOC_L corresponding to the recommended charging point is less than the preset threshold, the processor 100 may provide a user guidance for the recommended charging point through the display device 30 as in S912.

When the deviation between the estimated SOC SOC_opt corresponding to the recommended charging point and the lower limit SOC SOC_L is greater than or equal to the preset threshold, the processor 100 may be configured to determine that there is no need to urgently charge the battery 41, so that the processor 100 may not provide guidance for the recommended charging point.

Figure 10:
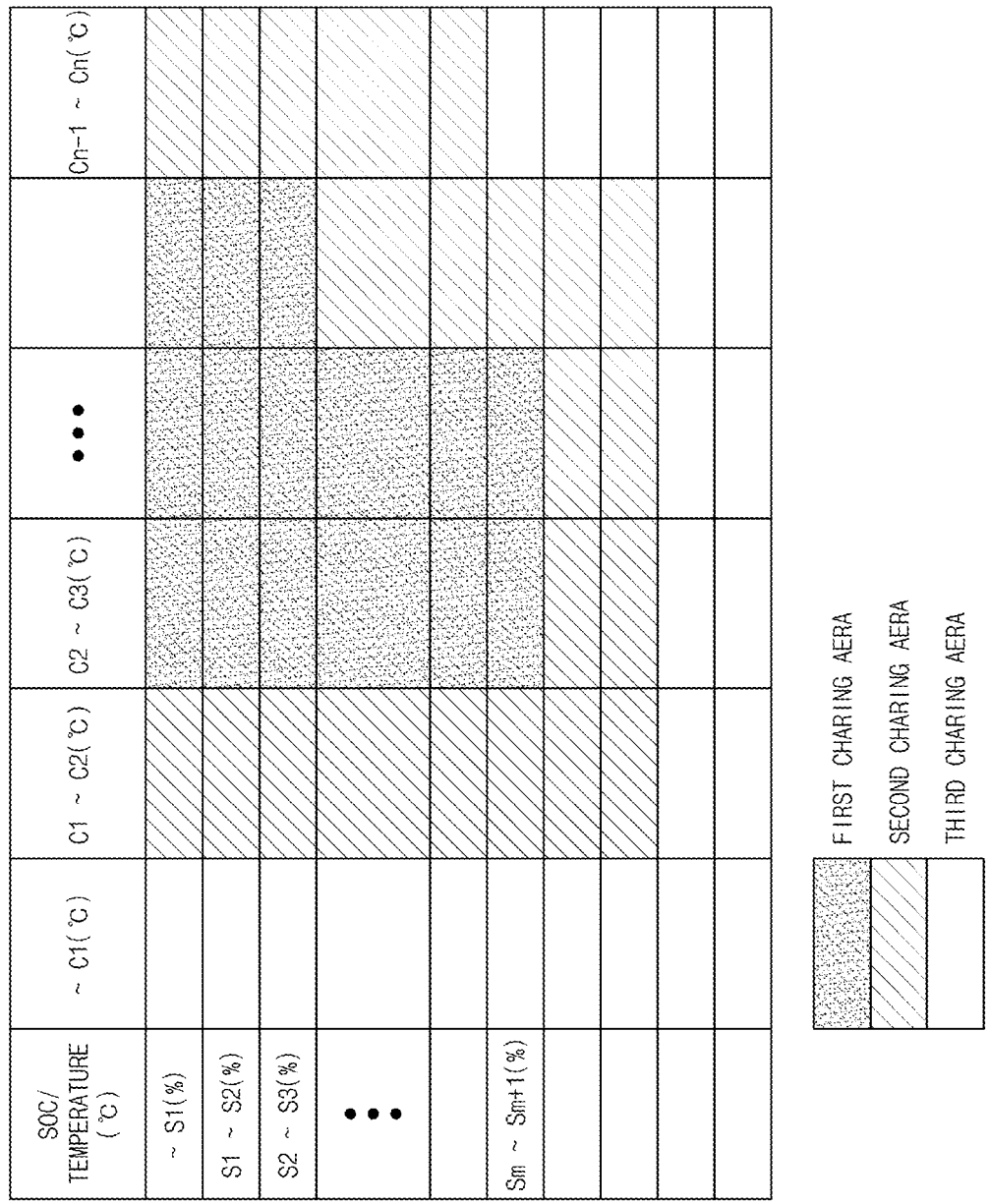
FIG. 10 is a diagram for describing a charging area according to charging efficiency.

FIG. 10 is a diagram for describing a charging area according to charging efficiency.

Referring to FIG. 10, the charging efficiency of the battery 41 may vary in accordance with the SOC value and temperature of the battery 41. In FIG. 10, the first charging area may indicate an area with the highest charging efficiency, and the third charging area may indicate an area with the lowest charging efficiency.

The charging efficiency of the battery 41 may be the highest in a room temperature range. That is, C1 to C_n−1 may indicate a room temperature range. Accordingly, the processor 100 may set a temperature corresponding to C1 as a charging reference temperature T_ref and control the temperature of the battery 41 to reach the charging reference temperature T_ref as a target temperature.

Figure 11:
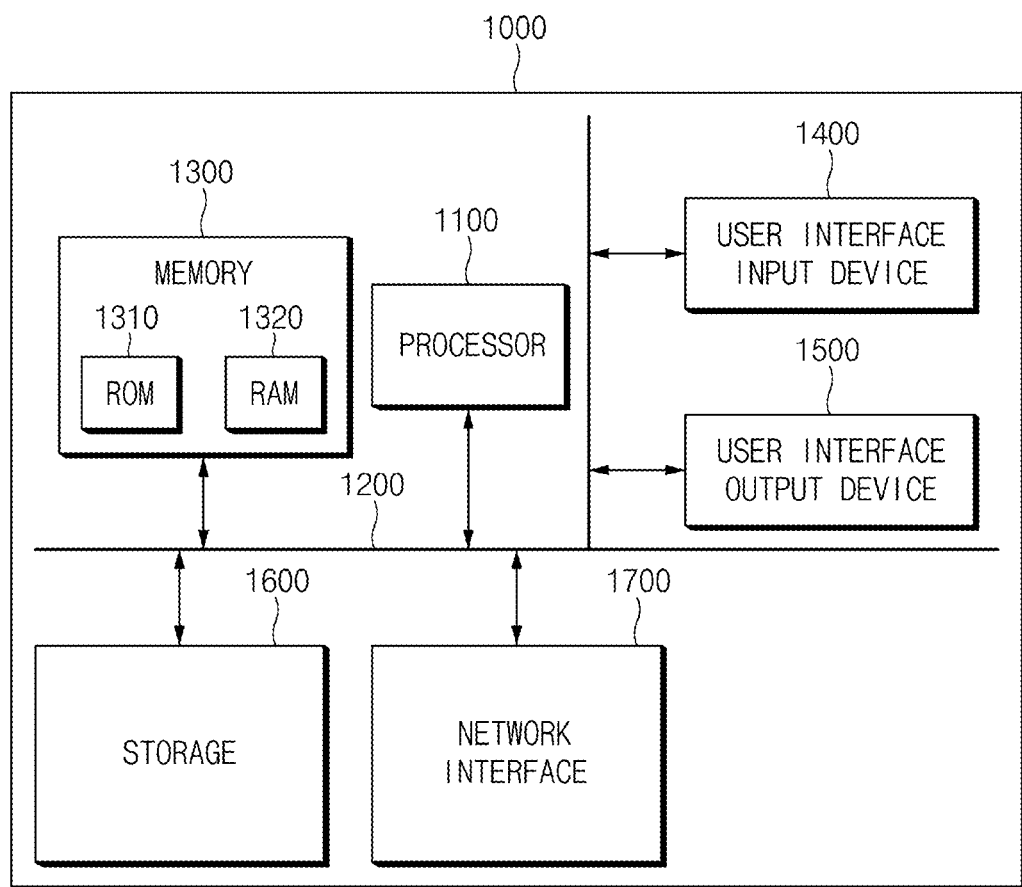
FIG. 11 is a diagram illustrating a computing system according to an exemplary embodiment of the present disclosure.

FIG. 11 illustrates a computing system according to an exemplary embodiment of the present disclosure.

Referring to FIG. 11, a computing system 1000 may include at least one processor 1100, a memory 1300, a user interface input device 1400, a user interface output device 1500, storage 1600, and a network interface 1700, which are connected to each other via a bus 1200.

The processor 1100 may be a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include a Read Only Memory (ROM) and a Random Access Memory (RAM).

Thus, the operations of the method or the algorithm described in connection with the exemplary embodiments included herein may be embodied directly in hardware or a software module executed by the processor 1100, or in a combination thereof. The software module may reside on a storage medium (that is, the memory 1300 and/or the storage 1600) such as a RAM, a flash memory, a ROM, an EPROM, an EEPROM, a register, a hard disk, a removable disk, and a CD-ROM.

The exemplary storage medium may be coupled to the processor 1100, and the processor 1100 may read information out of the storage medium and may record information in the storage medium. Alternatively, the storage medium may be integrated with the processor 1100. The processor and the storage medium may reside in an application specific integrated circuit (ASIC). The ASIC may reside within a user terminal. In another case, the processor and the storage medium may reside in the user terminal as separate components.

The above description is merely illustrative of the technical idea of the present disclosure, and various modifications and variations may be made without departing from the essential characteristics of the present disclosure by those skilled in the art to which the present disclosure pertains.

Therefore, the exemplary embodiments of the present disclosure are provided to explain the spirit and scope of the present disclosure, but not to limit them, so that the spirit and scope of the present disclosure is not limited by the embodiments. The scope of protection of the present disclosure should be interpreted by the following claims, and all technical ideas within the scope equivalent thereto should be construed as being included in the scope of the present disclosure.

According to the exemplary embodiment of the present disclosure, the battery charging time of the vehicle may be reduced by estimating a point where the battery charging time is minimized and informing the driver of the point.

Furthermore, according to the exemplary embodiment of the present disclosure, the battery charging time may be reduced when the present disclosure is applied to various batteries and battery systems regardless of the hardware design of the batteries and the battery systems by use of a software-based algorithm.

Furthermore, according to the exemplary embodiment of the present disclosure, it is possible to provide a guidance for the optimal battery charging point in real time according to the driving route of the vehicle.

Furthermore, various effects may be provided that are directly or indirectly understood through the present disclosure.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The term "and/or" may include a combination of a plurality of related listed items or any of a plurality of related listed items. For example, "A and/or B" includes all three cases such as "A", "B", and "A and B".

In the present specification, unless stated otherwise, a singular expression includes a plural expression unless the context clearly indicates otherwise.

In exemplary embodiments of the present disclosure, "at least one of A and B" may refer to "at least one of A or B" or "at least one of combinations of one or more of A and B". In addition, "one or more of A and B" may refer to "one or more of A or B" or "one or more of combinations of one or more of A and B".

In the exemplary embodiment of the present disclosure, it should be understood that a term such as "include" or "have" is directed to designate that the features, numbers, steps, operations, elements, parts, or combinations thereof described in the specification are present, and does not preclude the possibility of addition or presence of one or more other features, numbers, steps, operations, elements, parts, or combinations thereof.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A battery management apparatus comprising:
    a battery configured to provide energy to a drive motor that drives a vehicle;
    a battery system connected to the battery and configured for measuring a temperature and a state of charge (SOC) value of the battery and control the temperature of the battery; and
    a processor communicatively connected to the battery system and configured to:
        determine an estimated battery temperature and an estimated SOC value of the battery at each of at least one stopover on an expected driving route of the vehicle to reach a destination of the vehicle,
        determine an estimated charging time for charging the battery to a preset capacity at the at least one stopover based on the estimated battery temperature and the estimated SOC value, and
        provide a user with a guidance for the estimated charging time at a stopover at which charging of the battery is performed or a recommended charging point among at least one of the stopover on the expected driving route where the estimated charging time is minimum.

2. The battery management apparatus of claim 1, wherein the processor is further configured to:
    determine estimated cumulative energy consumption of the battery to reach the at least one stopover,
    determine an attenuation of the SOC value of the battery according to the estimated cumulative energy consumption, and
    obtain the estimated SOC value by subtracting the attenuation of the SOC value of the battery from a measured SOC value of the battery to determine the estimated SOC value of the battery.

3. The battery management apparatus of claim 2, wherein the processor is further configured to:
    divide the expected driving route into a plurality of sections,
    estimate an average speed of each of the sections,
    determine an estimated energy consumption of each of the sections based on the average speed, and
    determine the estimated cumulative energy consumption by accumulating the estimated energy consumption to reach the at least one stopover.

4. The battery management apparatus of claim 2, wherein the processor is further configured to obtain the estimated battery temperature using a battery temperature prediction model set in advance based on the SOC value of the battery and the estimated cumulative energy consumption.

5. The battery management apparatus of claim 1, wherein the processor is further configured to determine the estimated charging time using a preset charging time function to which the estimated battery temperature and the estimated SOC value are input as variables thereof.

6. The battery management apparatus of claim 1, wherein the processor is further configured to provide a guidance for the recommended charging point in response that a deviation between the estimated SOC value of the battery at the recommended charging point and a preset lower limit SOC value is less than a preset threshold.

7. The battery management apparatus of claim 6, wherein the processor is further configured to determine the estimated battery temperature and the estimated SOC value to reach a point where the estimated SOC value corresponds to a magnitude of the preset lower limit SOC value in response that a distance of the vehicle to the destination is equal to or greater than a distance to empty (DTE).

8. The battery management apparatus of claim 7, wherein the processor is further configured to virtually control a temperature of the battery to reduce a temperature deviation in response that the temperature deviation between the estimated battery temperature at the recommended charging point and a preset charging reference temperature is greater than or equal to a threshold temperature and that the distance to the destination is greater than the distance to empty.

9. The battery management apparatus of claim 8, wherein the processor is further configured to, after the temperature of the battery has been virtually controlled,
    determine a temperature control period in which the temperature of the battery varies from the estimated battery temperature at the recommended charging point to a minimum charging temperature,
    redetermine the estimated SOC value and the estimated battery temperature based on energy consumption of the battery during the temperature control period,
    re-obtain the estimated charging time based on the estimated SOC value and the estimated battery temperature, and
    redetermine a recommended charging point at which the estimated charging time is minimum.

10. The battery management apparatus of claim 8, wherein the processor is further configured to assume operation of the battery system to control the temperature of the battery using energy consumption of the battery.

11. A battery management method, comprising:
  determining, by a processor, an estimated battery temperature and an estimated state of charge (SOC) value of a battery at each of at least one stopover on an expected driving route of a vehicle to reach a destination of the vehicle;
  determining, by the processor, an estimated charging time for charging the battery to a preset capacity at the at least one stopover based on the estimated battery temperature and the estimated SOC value; and
  providing, by the processor, a user with a guidance for the estimated charging time at a stopover at which charging of the battery is performed and a recommended charging point among at least one of the stopover on the expected driving route where the estimated charging time is minimum.

12. The battery management method of claim 11, wherein the determining of the estimated SOC value of the battery includes:
  determining estimated cumulative energy consumption of the battery to reach the at least one stopover;
  determining an attenuation of the SOC value of the battery according to the estimated cumulative energy consumption; and
  obtaining the estimated SOC value by subtracting the attenuation of the SOC value of the battery from a measured SOC value of the battery to determine the estimated SOC value of the battery.

13. The battery management method of claim 12, wherein the determining of the estimated cumulative energy consumption includes:
  dividing the expected driving route into a plurality of sections;
  estimating an average speed of each of the sections;
  determining an estimated energy consumption of each of the sections based on the average speed; and
  determining the estimated cumulative energy consumption by accumulating the estimated energy consumption to reach the at least one stopover.

14. The battery management method of claim 12, wherein the determining of the estimated battery temperature of the battery includes using a battery temperature prediction model set in advance based on the SOC value of the battery and the estimated cumulative energy consumption.

15. The battery management method of claim 11, wherein the determining of the estimated charging time includes using a preset charging time function to which the estimated battery temperature and the estimated SOC value are input as variables thereof.

16. The battery management method of claim 11, wherein the providing of the guidance for the recommended charging point includes providing the guidance for the recommended charging point when a deviation between the estimated SOC value of the battery at the recommended charging point and a preset lower limit SOC value is less than a preset threshold.

17. The battery management method of claim 11, wherein the determining of the estimated battery temperature and the estimated SOC value includes determining the estimated battery temperature and the estimated SOC value to reach a point where the estimated SOC value corresponds to a magnitude of a preset lower limit SOC value in response that a distance of the vehicle to the destination is equal to or greater than a distance to empty (DTE).

18. The battery management method of claim 17, further including:
  virtually controlling a temperature of the battery to reduce a temperature deviation when the temperature deviation between the estimated battery temperature at the recommended charging point and a preset charging reference temperature is greater than or equal to a threshold temperature in response that the distance to the destination is greater than the distance to empty.

19. The battery management method of claim 18, further including: after the temperature of the battery has been virtually controlled,
  determining a temperature control period in which the temperature of the battery varies from the estimated battery temperature at the recommended charging point to a minimum charging temperature;
  redetermining the estimated SOC value and the estimated battery temperature based on energy consumption of the battery during the temperature control period; and
  re-obtaining the estimated charging time based on the estimated SOC value and the estimated battery temperature, and redetermining a recommended charging point at which the estimated charging time is minimum.

20. The battery management method of claim 18, wherein the virtually controlling of the temperature of the battery includes controlling the temperature of the battery using energy consumption of the battery.

* * * * *